United States Patent [19]
Slinkman

[11] Patent Number: 6,101,519
[45] Date of Patent: Aug. 8, 2000

[54] METHOD FOR EFFICIENTLY DETERMINING A FERMI-DIRAC INTEGRALS

[75] Inventor: James A. Slinkman, Montpelier, Vt.

[73] Assignee: International Business Machines Corporation, Armonk, N.Y.

[21] Appl. No.: 09/098,909

[22] Filed: Jun. 17, 1998

[51] Int. Cl.$^7$ ........................................................ G06F 7/38
[52] U.S. Cl. .................................................................. 708/444
[58] Field of Search ............................... 708/444; 438/14

[56] References Cited

U.S. PATENT DOCUMENTS

| | | | |
|---|---|---|---|
| 3,995,216 | 11/1976 | Yun | 324/765 |
| 4,506,436 | 3/1985 | Bakeman, Jr. et al. | 438/449 |
| 4,700,353 | 10/1987 | Van Gieson et al. | 372/26 |

OTHER PUBLICATIONS

Ghazavi et al, "Two–Dimensional MOS Device Modeling at Low Temperature", IEEE, pp. 189–192, 1992.

*Primary Examiner*—Tan V. Mai
*Attorney, Agent, or Firm*—Pollock Vande Sande & Amernick

[57] ABSTRACT

A computer implemented method for efficiently evaluating a Fourier sine/cosine transform of a bounded analytical function is described. The transform is computed in a plurality of steps which reduces the required transform to a sum of two terms which can be efficiently evaluated using a digital computer. The computer evaluates the first and second terms as definite integrals. The first integral is evaluated via standard techniques, and the second integral is evaluated as a definite integral of a sum of terms which converges. The method is advantageously used to provide a model of semiconductor devices which takes into account quantum mechanical effects while minimizing compute operation time. A look-up table of semiconductor carrier density versus spatially dependent field values can optionally be constructed.

10 Claims, 3 Drawing Sheets

METHOD FOR EFFICIENTLY DETERMINING A FERMI-DIRAC INTEGRALS

BACKGROUND OF THE INVENTION

The present invention relates to a method for efficiently computing the value of sine or cosine transforms of a bounded analytical function. Specifically, a method for efficiently computing the value of a transform using a digital computer is described.

In various engineering disciplines the need arises for efficiently evaluating sine or cosine transforms of a bounded analytic function. The sine or cosine transform has been traditionally evaluated using a digital computer. One such standard computation technique involves the use of a Gauss-Legendre integration as set forth in a text entitled, "Numerical Recipes," by W.H. Press et al.

When computing the sine or cosine transforms using the prior art digital computer techniques adapted to execute a Gauss-Legendre integration, computation time is excessive, requiring up to 10,000 CPU seconds using a modern digital computer. The lengthy time is a significant disadvantage in using the sine or cosine transforms.

One specific example of the need for efficiently calculating the transform is in the field of MOSFET design. Designers of MOSFET semiconductors would typically use a sine or cosine transform to evaluate the carrier density function (nz) in the semiconductor material. The process of calculating the carrier density function is set forth in a paper co-authored by the inventor, entitled "Quantum Mechanical Screening Current in Silicon MOS Devices."

The traditional way of calculating carrier density involves the calculation of the integral of a periodic function, referred to as the modified Fermi-Dirac integral is set forth in the paper by Slinkman et al. The evaluation of the integral makes it possible to determine not only the current density, but also the related, measurable quantity of gate capacitance for a MOSFET device.

It is a disadvantage to use the prior art technique for digitally computing the Fermi-Dirac integral by utilizing the aforementioned Gauss-Legendre integration. Up to 7200 CPU seconds may be needed in order to calculate only one of several equivalent silicon conduction valleys for a MOSFET device.

Given the computational inefficiencies of the traditional techniques for computing digitally a value of a class of integrals which are bounded over the infinite domain, the present invention provides for a method for efficiently computing the transforms.

SUMMARY OF THE INVENTION

The present invention provides a computer implemented method which is capable of an efficient evaluation of a transform of a bounded analytical function which may be used to model semiconductor materials. In accordance with the invention, the transform of the analytical function is computed in a plurality of steps, the first of which is to reduce the required transform to a sum of two terms, each representing the computation of a definite integral.

The invention takes advantage of the fact that when a transform is expressed as the summation of two definite integrals of a function, the first integral may be usually easily determined from standard numerical integration techniques, and the second term, to be combined with the first term, is evaluated as the integral of a sum of a number of terms. The second term takes advantage of nearly equal and opposite half periods of the function which result in the sum converging after a finite number of terms are computed. In this way, the use of a definite integral of a convergent sum improves the computation efficiency over those techniques which require evaluation of a plurality of integrals.

In accordance with the invention, a Fourier transform $G(\omega)$, generally defined as $$G(\omega) = \sqrt{\frac{2}{\pi}} \int_0^\infty dt\, g(t)\sin(\omega t)$$

where the bounded function g(t) is provided, so that the limit of $g(t) \to 0$ as $t \to \infty$, may be initially computed as the sum of two definite integrals $G1(\omega)$ and $G2(\omega)$. The first and second terms $G1(\omega)$, $G2(\omega)$, are represented as, $$G1(\omega) = \sqrt{\frac{2}{\pi}} \int_0^{(\pi/\omega)} dt\, g(t)\sin(\omega t) \quad \text{(A)}$$

and $$G_2(\omega) = \sqrt{\frac{2}{\pi}} \sum_{n=1}^\infty \left( \int_{(n\pi/\omega)}^{(n-1)(\pi/\omega)} dt\, g(t)\sin(\omega t) \right) \quad \text{(B)}$$

By evaluating Equation B as an integral of a summation, rather than the summation of a plurality of integrals, the transform can be evaluated in fewer than ten computer cycles versus the thousands of computer cycles required using the prior art Gauss-Legendre process.

DESCRIPTION OF THE PREFERRED EMBODIMENT

Figure 1:
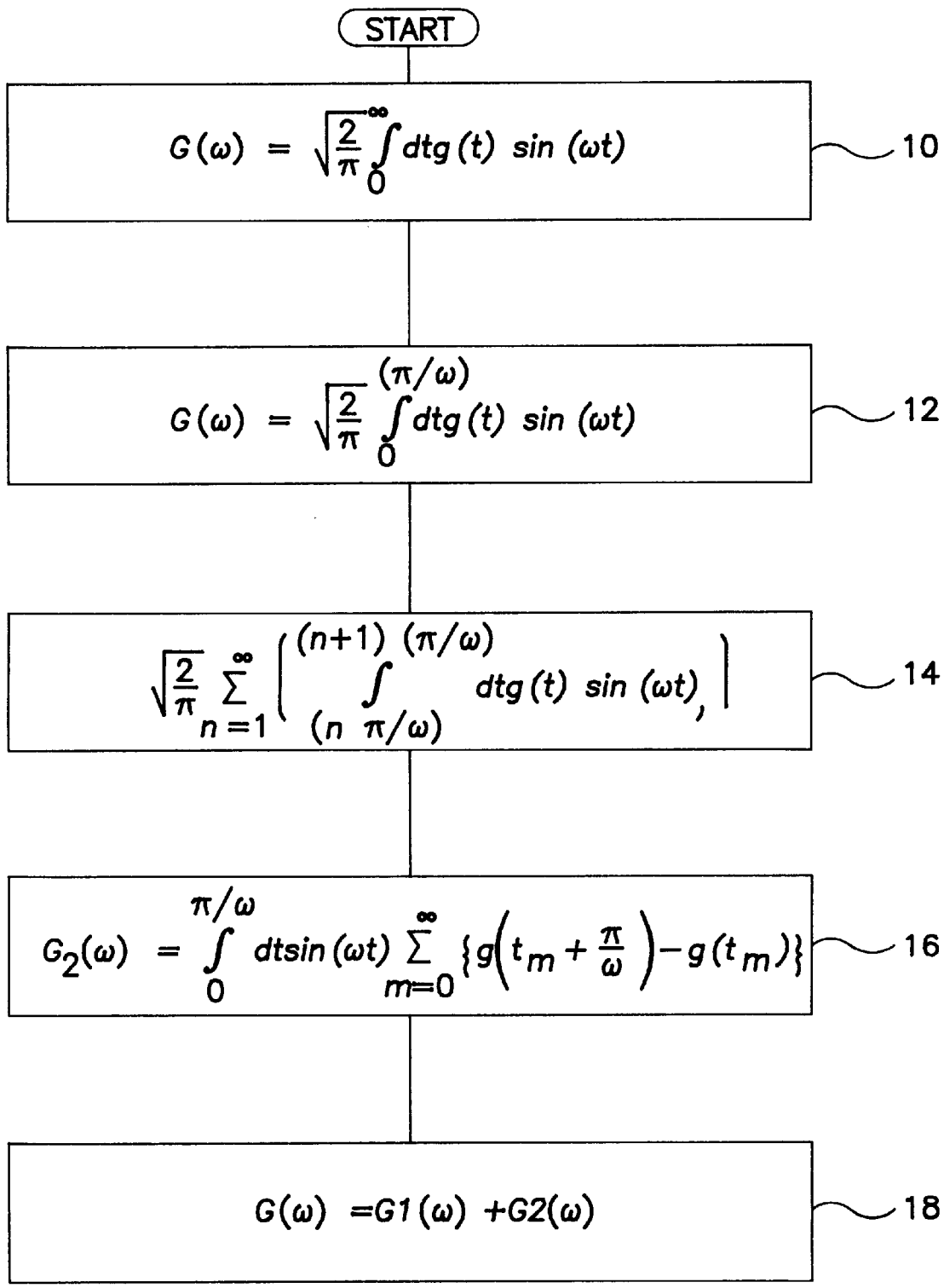
FIG. 1 is a general flowchart demonstrating the execution sequence for determining the value of a sine or cosine transform from a bounded analytic function G(t)

The steps for execution by the digital computer of the process in accordance with the present invention is set forth in FIG. 1. Referring now to FIG. 1, there is shown the general Fourier transform $G(\omega)$ for a bounded analytical function g(t). The function g(t) is bounded in that $$\lim_{t \to \infty} g(t) \to 0.$$

To avoid the computational inefficiencies of calculating the indefinite integrals which naturally result from processing the transform of step 10, the function $G(\omega)$ is first split to form a sum of two components, $G1(\omega)$ and $G2(\omega)$ The first of these components, illustrated as step 12, constitutes a definite integral, which is evaluated over a well-defined integral by standard numerical integration techniques. The evaluation of G1(ω) is effected in step 12 by a straightforward numerical integration using for example, the Gauss-Legendre method over the interval 0→π(ω).

The remaining term for calculating the transform G(ω) is G2(ω).

As illustrated in step 14, the term G2(ω) represents a sum of definite integrals over the period n·π/ω 2 to (n+1)(π/ω).

The foregoing formulation of G2(ω) is computationally burdensome for a digital computer in that a sum of definite integrals must be evaluated by the computer. The process in accordance with the present invention takes advantage of the ability to evaluate G2(ω) as the definite integral of the summation of a plurality of terms which converges, by taking advantage of nearly equal and opposite n periods for the function sin(ωt).

The result is the determination in step 16 of G2 (ω) which is represented by a definite integral over the period 0→π/ω, of a converging sum which diminishes with increasing values of the period index m. The summand represented by the execution of step 16 is in the form of an alternating series, converging at an order of $$1/m(1/(\omega m)\left(\frac{\partial g}{\partial t}\right)$$

partial derivative of g with respect to ω.

The ability to digitally compute values for G2(ω) efficiently, as the definite integral of the sum of a converging series of terms reduces the digital computer computation time by an order of magnitude of 1,000/1.

Therefore, the ability to digitally compute G2(ω) efficiently relies on the ability to represent G2(ω) in the form of:

$$G_2(\omega) = \int_0^{\pi/\omega} dt \sin(\omega t) \sum_{m=0}^{\infty} \left\{ g\left(t_m + \frac{\pi}{\omega}\right) - g(t_m) \right\}.$$

The computationally efficient evaluation of G2(ω) is possible by realizing the following relationship.

By expressing the function t as $t_n$, in B, $$t_n = t + m \cdot \frac{\pi}{\omega},$$

G2(ω) may be represented by:

$$G_2(\omega) = \sum_{n=1}^{\infty} (-1)^n \int_0^{\pi/\omega} dt\, g(t_n) \sin(\omega t)$$

which is further reduced to:

$$G_2(\omega) = \int_0^{\pi/\omega} dt \sin(\omega t) \sum_{n=1}^{\text{odd}} \left\{ g\left(t_n + \frac{\pi}{\omega}\right) - g(t_n) \right\}.$$

Further, as n→2(m+1), it is possible to represent $$\sum_{n=1}^{\text{odd}} \rightarrow \sum_{m=0}^{\infty}$$

This results in the computation of G2 (ω) as the definite integral represented by step 16 as:

$$G_2(\omega) = \int_0^{\pi/\omega} dt \sin(\omega t) \sum_{m=0}^{\infty} \left\{ g\left(t_m + \frac{\pi}{\omega}\right) - g(t_m) \right\}$$

where $$t_m \equiv t + (2n + 1)\frac{\pi}{\omega}$$

for bounded functions, g(t), the sum in the integrand will converge rapidly, significantly reducing computation time.

The values of G1(ω) and G2 (ω) are then combined together in step 18 to provide an evaluation of G(ω).

In the field of semiconductor manufacture, a design of MOSFET devices includes the evaluation of carrier density functions, represented as n(z) for a silicon layer 20 which underlies a high quality silicon oxide film 22. The silicon 20 is doped with impurities such as phosphorus (an electron donor) or boron (an electron acceptor). The resultant dopant causes an excess of carriers (electrons in the case of n-type doped silicon or holes in the case of p-type doped silicon). The carriers are redistributed spatially 21 in the silicon due to the electric field induced in the structure by the voltage applied to the metal or polysilicon gate 23. The gate capacitance C(Vg) for the device is a sensitive measure of how carriers are redistributed in the silicon area. The oxide 22 thickness which may be, for instance, less 10 nm, produces quantum mechanical effect of a depletion, or reduction, of carrier density near the oxide/silicon interface.

The precise knowledge of the gate capacitance C versus voltage Vg function of semiconductor materials is essential in the design of MOSFET devices in order to computer model the device. The simulation of the MOSFET carrier density and the consequent derivation of the voltage Vg versus gate capacitance C function provides a useful tool for increasing productivity and efficiency in the manufacture of these devices.

The special dependence of the carrier density function, which is used for computing the voltage Vg versus the gate capacitance C function of MOSFET devices, is computationally evaluated using a carrier density function n(z) which is in the form of a modified Fermi-Dirac integral of a periodic function. To illustrate the similarities between the Fermi-Dirac integral and the transform executed in the flow chart of FIG. 1, this modifies Fermi-Dirac integral may be represented as follows:

$$n(z) = \sqrt{\frac{2}{\pi}} \int_0^{\infty} \frac{dy\left\{\sqrt{y} - \frac{\sin\left((2Z\sqrt{y})/\lambda\right)}{2Z}\right\}}{(1 + \exp(y - \exp(-Z/\lambda)))}$$

The F(Z) term may be represented by:

$$F(Z) = \sqrt{\frac{2}{\pi}} \int_0^{\infty} dy \frac{\sqrt{y}}{(1 + \exp(y - \exp(-Z/\lambda)))}$$

and is the standard Fermi-Dirac integral, by definition. This integral has been tabulated in look-up tables, set forthin the well-known reference, "Semiconductor Statistics" by J. S. Blakemoore.

As with the Fourier transform of FIG. 1, the Fermi-Dirac integral may be computed using the Gauss-Legendre technique. However, evaluating the integral using the foregoing computer implemented technique expedites processing several thousandfold over the Gauss-Legendre technique. The transform G(z) is defined in terms of a definite integral, G1(z) combined with the term G2(z) representing the reformulation of an integral of a sum of a plurality of periodic terms, represented by the zero-order Bessel function, $$j_0((2z/\lambda) \equiv \frac{\sin(2Z/\lambda)\sqrt{y}}{(2Z/\lambda)\sqrt{y}}$$

The second term in the equation for n(z) above is G(z):

$$G(Z) = \sqrt{\frac{2}{\pi}} \int_0^\infty dy \frac{-\left\{\frac{\sin(2Z/\lambda)\sqrt{y}}{(2Z)/\lambda}\right\}}{(1 + \exp(y - \exp(-Z/\lambda)))}$$

The numerator of the integrand is $$j_0((2z/\lambda)\sqrt{y}$$

multiplied by $$\sqrt{y}.$$

The above zero-order Bessel function term represents a Fermi-Dirac integral of a periodic function where z represents the depth into the surface of the semiconductor material. This function G(Z), is therefore of the form wherein the technique disclosed can be used to advantage. The independent variable, ω, of FIG. 1 has been replaced by z and the integration variable t is replaced by y.

By reformulating the function G(z) as illustrated, the computation time for evaluating G(z) was reduced from 7200 CPU seconds on an IBM RFC 6000 computer to approximately 1 CPU second for a efficiency improvement of 7,000%.

Figure 2:
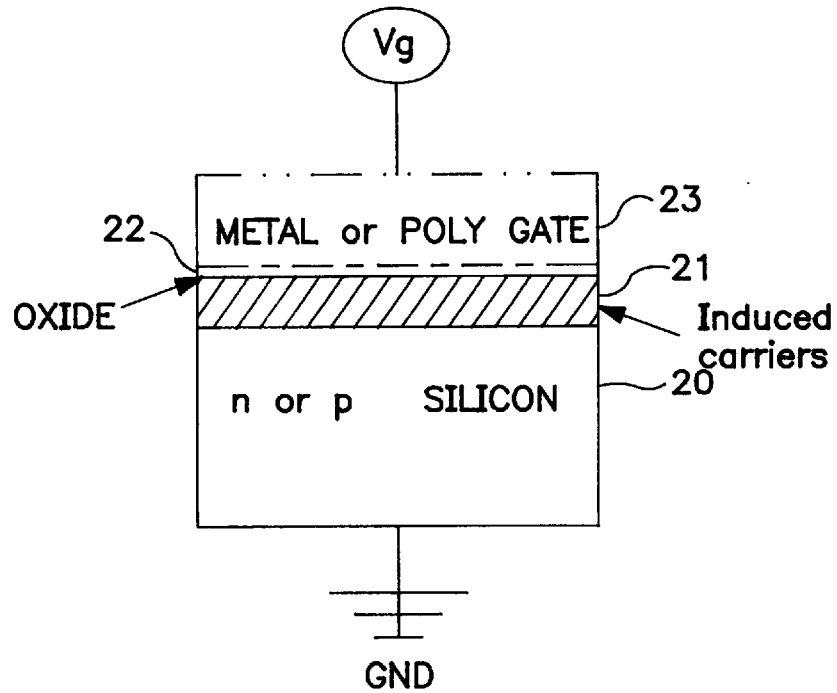
FIG. 2 illustrates the application of the foregoing method in determining the capacitance and carrier density function of a MOSFET device.
Figure 3:
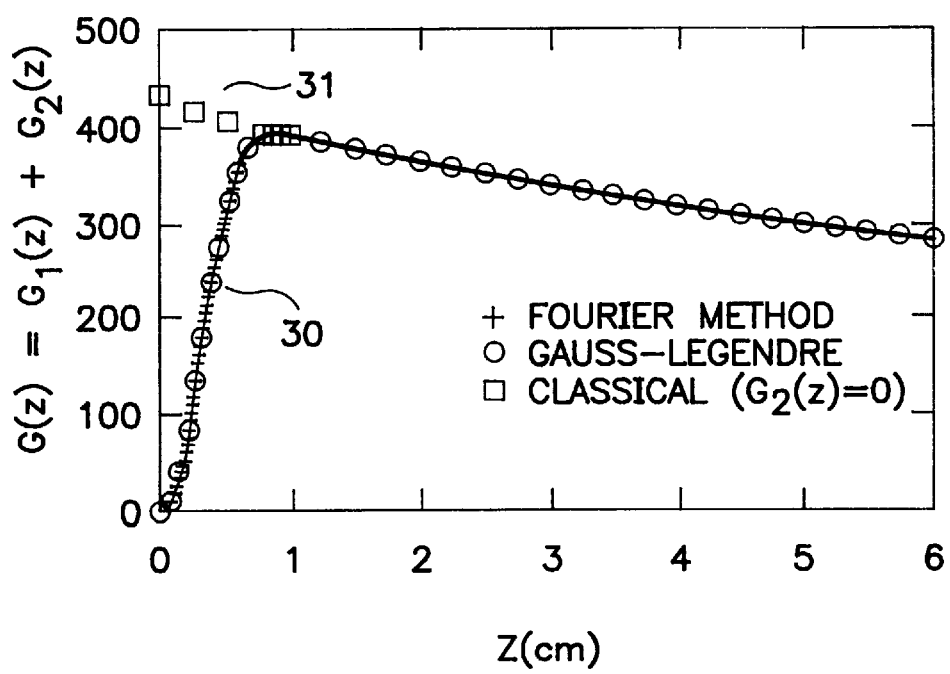
FIG. 3 illustrates the correspondence between the results of calculating the transform in accordance with FIG. 1 and a conventional Gauss-Legendre process.

FIG. 3 represents the calculation of G(z) using the foregoing technique, as well as those using more computationally inefficient Gauss-Legendre equation in an application program known as MAPLE 30. FIG. 2 also illustrates, by virtue of the open squares 31, the effects of the term G2(z) on the carrier density n(z). G2(z) accounts for the quantum mechanical effects experienced as the distance to the surface of the semiconductor material decreases from approximately $0.75 \times 10^{-6}$ cm to the surface (zero).

The determination of G(z) utilizing the more computationally efficient process of FIG. 1 presents a more practical simulation of the MOSFET carrier density. This is particularly useful when realizing that the calculation may have to be performed many millions of times during a design effort.

The modified Fermi-Dirac integral $$n(z) = \sqrt{\frac{2}{\pi}} \int_0^\infty dy \frac{\left\{\sqrt{y} - \frac{\sin((2Z\sqrt{y})/\lambda)}{2Z}\right\}}{(1 + \exp(y - \exp(-Z/\lambda)))}$$

is a representation of a more specific form of calculation for the carrier density function n(z). The more general function is represented by $$n(z) = N_C \cdot (2/\pi) \int_0^\infty dy \left(\frac{\sqrt{y}}{1 + \exp(y - e\Phi_\eta(z))}\right) \cdot \left(1 - j_0(2Z/\lambda)\sqrt{y}\right)$$

where, essentially, $\phi_\eta(z)$, replaces exp (−Z/λ) above, as set forth in the Slinkman et al. publication. In the above, a normalized quasi-Fermi level is defined by the following:

$$\phi_\eta(z) = \frac{(\epsilon_F(z) - e\psi(z) - E_c)}{kT}$$

case where $\epsilon_F(z)$ is the local Fermi level and Ψ(z) is the electric potential for the silicon. In actual practice the scale length λ assumes values on the order of 1 to 2 nm. At z=0, along the surface of the semiconductor material Ψ(z) is defined to be Ψ0, the surface potential. The quantity kT is the mean thermal energy of distribution of Fermi particles in a heat reservoir, and equals 0.025 eV at room temperature, an assumption which is made in the calculation to be described with respect to FIG. 3. $N_C$ is the electron density of states as is known from the literature. The surface potential, $-\Psi_0$ is the voltage applied to the gate of the MOSFET of FIG. 2. It should be noted that in those simulations of MOSFETs which are designed with polysilicon gates instead of metal gates, V and $-\Psi_0$ will differ by an additive constant value, usually on the order of +0.5 volts (−0.5 V) for a p-type (n-type) poly gate. A further refinement of the method is to compute G(Z) over the entire range of φ(Z) once and store it in a look-up table in a manner similar to F(Z) described above. Subsequent evaluations of n(z) may be made by referring to a look-up table for F(Z) and a second look-up table for G(Z), and combining the results.

Having thus established a carrier density for the semiconductor material, gate capacitance can be determined as the difference per unit voltage of the carrier density with respect to the integrated carrier density, yields the voltage induced surface carrier charge density $N_s$ as $$N_S = \int_0^\infty dz \cdot n(z),$$

from which the gate capacitance may be determined.

Figure 4:
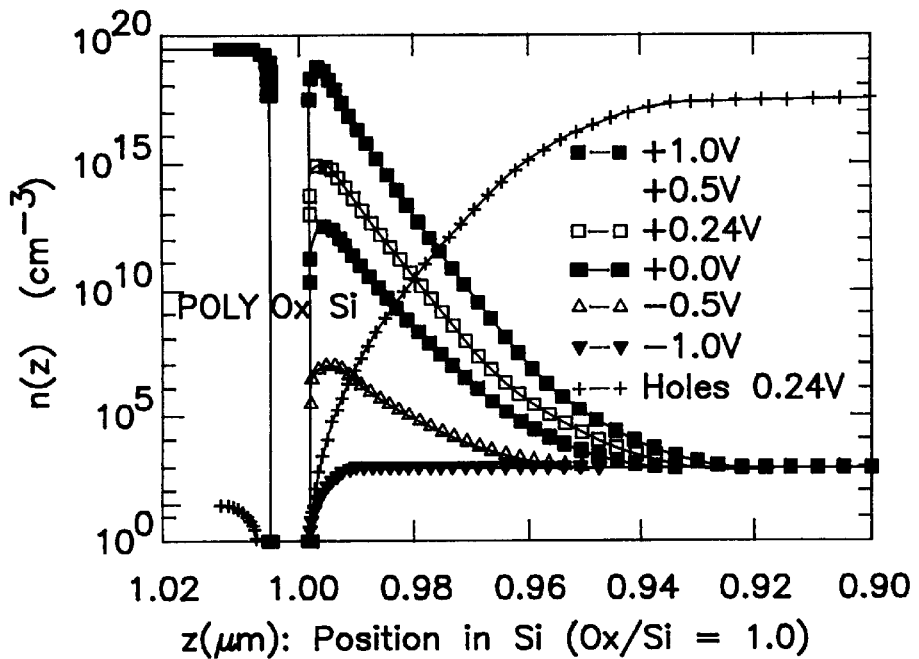
FIG. 4 illustrates the computed electron density versus depth, utilizing the method in accordance with FIG. 1.

Referring now to FIG. 4, an illustration of the carrier charge density for several gate voltage values is shown calculated using the foregoing efficient computer computation method. The Figure illustrates the carrier density which has been computed for a MOSFET silicon substrate having an insulating oxide and polysilicon gate material. The most important features in the curves representing electron density is the appearance of peak values around z=1.0 nm, which occurs because of quantum mechanic effects near the surface of these materials.

The shape of the electron density curves of FIG. 4 are similar to the curves in FIG. 3. The differences are because of a normalizing coefficient Nc, and because the form of $\phi_n(z)$ is different.

Figure 5:
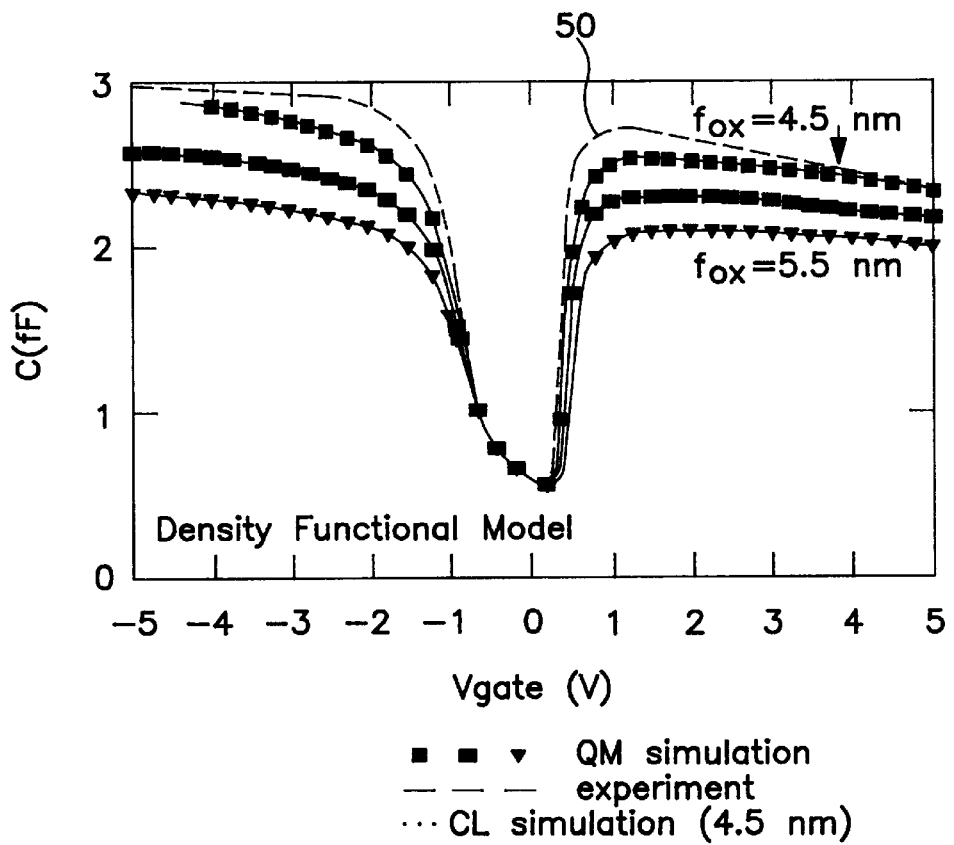
FIG. 5 illustrates the capacitance versus gate voltage function for an N-channel MOS capacitor computed using the foregoing carrier density function determined from the process of FIG. 1.

Having obtained values of the carrier density as shown in FIG. 4, the gate capacitance may be subsequently digitally computed. The results of this computation are shown in FIG. 5 as follows:

$$N_S = \int_0^\infty dz \cdot n(z)$$

$$c(v) = \frac{dN_s}{d\psi_0} = e\frac{dN_s}{dV}$$

The calculated curves are shown for different oxide thickness of 4.5 nm, 5.0 nm and 5.5 nm. All represent a thickness for which creates significant mechanical carrier completion, as was noted with respect to FIG. 3. Actual silicon structures were created based on the modeled structures, and gate capacitance was measured and compared in FIG. 5 with the predicted or simulated gate capacitance. The quantum mechanical effects, represented by the calculation G2(z), contributes to the correspondence between the actual device gate capacitance and the simulated capacitance obtained from the calculation G1(z). If the effects of such quantum mechanics were ignored, the simulated gate capacitance would be the top (dashed) curve 50, which is clearly erroneous. Thus, it is necessary to calculate G2(z) to accurately represent the gate capacitance derived in the simulation.

Thus, there has been described a new computer implementation and method for computationally evaluating a sine or cosine transform, for functions G(t) which are bounded.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for efficiently determining a Fermi-Dirac integral G(Z) comprising:

reducing said Fermi-Dirac integral to first G1(Z) and second G2(z) terms, said first term G1(Z) comprising a Fermi-Dirac integral of order ½;

$$G_1(Z) = \sqrt{\frac{2}{\pi}} \int_0^\infty dy \frac{\sqrt{y}}{(1 + \exp(y - \phi_n(Z)))}$$

and said second term G2(Z) comprising a Fermi-Dirac integral of a periodic function which includes a summation of terms which converges as:

$$G2(Z) = \sqrt{\frac{2}{\pi}} \int_0^\infty dy \frac{-\left\{\frac{\sin(2Z/\lambda)\sqrt{y}}{(2Z/\lambda)}\right\}}{(1 + \exp(y - \phi_n(Z)))}$$

digitally computing a value for said reduced first term from a lookup table for the values Z over the integral 0 to infinity;
digitally computing a value for said second term G2(Z) for values of Z over the integral 0 to infinity; and
combining with said digital computer the results of computing said first and second terms for each value of Z.

2. The method of determining the carrier density function according to claim 1 wherein:

said second term G2(Z) comprises a Fermi-Dirac integral of a periodic function which includes a summation of two terms of $$-\left\{\frac{\sin(2Z/\lambda)\sqrt{y}}{(2Z/\lambda)\sqrt{y}}\right\}$$

which converges.

3. A method for efficiently determining the carrier density function of a single conduction valley of a semiconductor material comprising:

determining a normalized quasi-fermi level $\phi_n(Z)$ of said semiconductor material as:

$$\phi_\eta(z) = \frac{(\epsilon_F(z) - e\psi(z) - E_c)}{kT}$$

where $\epsilon_F$ is the local Fermi-level,
z is the depth of the semiconductor material,
$\Psi_0$ is the electric potential at the surface where Z=0, and
kt is the mean thermal energy of Fermi particles, digitally computing G1(z) from the Fermi-Dirac integral as:

$$G_1(Z) = \sqrt{\frac{2}{\pi}} \int_0^\infty dy \frac{\sqrt{y}}{(1 + \exp(y - \phi_n(Z)))}$$

digitally computing the integral of the periodic function G2(z) as:

$$G2(Z) = \sqrt{\frac{2}{\pi}} \int_0^\infty dy \frac{-\left\{\frac{\sin(2Z/\lambda)\sqrt{y}}{(2Z)/\lambda}\right\}}{(1 + \exp(y - \phi_n(Z)))}$$

combining the value of G1(Z) and G2(z) for each value of z.

4. The method according to claim 3 further comprising the step of computing the capacitance of said semiconductor material as the difference per unit voltage of the integrated carrier density with respect to the unit surface potential:

$$C(V) = -e\frac{dNs}{dV}.$$

5. The method according to claim 3 further comprising:

creating a look-up table of G2 (Z) for all values of Z.

6. A computer product having instructions for causing a computer to reduce a Fermi-Dirac integral (G(Z) by executing the steps comprising:

reducing said Fermi-Dirac integral to first G1(Z) and second G2(z) terms, said first term G1(Z) comprising a Fermi-Dirac integral of order ½;

$$G_1(Z) = \sqrt{\frac{2}{\pi}} \int_0^\infty dy \frac{\sqrt{y}}{(1+\exp(y-\phi_n(Z)))}$$

and said second term G2(Z) comprising a Fermi-Dirac integral of a periodic function which includes a summation of terms which converges as:

$$G2(Z) = \sqrt{\frac{2}{\pi}} \int_0^\infty dy \frac{-\left\{\frac{\sin(2Z/\lambda)\sqrt{y}}{(2Z)/\lambda}\right\}}{(1+\exp(y-\phi_n(Z)))}$$

digitally computing a value for said reduced first term from a lookup table for the values Z over the integral 0 to infinity;

digitally computing a value for said second term G2(Z) for values of Z over the integral 0 to infinity; and combining with said digital computer the results of computing said first and second terms for each value of Z.

7. The computer product of claim 6 having instructions for further causing the computer to execute the steps comprising:

said second term G2(Z) comprises a Fermi-Dirac integral of a periodic function which includes a summation of two terms of $$-\left\{\frac{\sin(2Z/\lambda)\sqrt{y}}{(2Z/\lambda)\sqrt{y}}\right\}$$

which converges.

8. A computer product for causing a computer to determine the carrier density function of a single conduction valley of a semiconductor material by executing the steps comprising:

determining normalized quasi-fermi level $\Phi_\eta(Z)$ of said semiconductor material as:

$$\phi_\eta(z) = \frac{(\varepsilon_F(z) - e\psi(z) - E_c)}{kT}$$

where $\varepsilon_F$ is the local Fermi-level,

Z is the depth of the semiconductor martial, $\Psi_0$ is the electric potential at the surface where Z=0, and kt is the mean thermal energy of Fermi particles, digitally computing G1(z) from the Fermi-Dirac integral as:

$$G_1(Z) = \sqrt{\frac{2}{\pi}} \int_0^\infty dy \frac{\sqrt{y}}{(1+\exp(y-\phi_n(-Z/\lambda)))}$$

digitally computing the integral of the periodic function G2(z) as:

$$G2(Z) = \sqrt{\frac{2}{\pi}} \int_0^\infty dy \frac{-\left\{\frac{\sin(2Z/\lambda)\sqrt{y}}{(2Z)/\lambda}\right\}}{(1+\exp(y-\Phi n(-Z/\lambda)))}$$

combining the value of G1(Z) and G2(z) for each value of z.

9. The computer product of claim 8 having instructions for further causing the computer to execute the step comprising: the step of computing the capacitance of said semiconductor material as the difference per unit voltage of the integrated carrier density with respect to the unit surface potential:

$$C(V) = -e\frac{dNs}{dV}.$$

10. The computer product of claim 8 having instructions for further causing the computer to execute the step of creating a look-up table of G2(Z) for all values of Z.

\* \* \* \* \*